United States Patent
Moloney

(10) Patent No.: US 12,190,247 B2
(45) Date of Patent: Jan. 7, 2025

(54) SYSTEMS AND METHODS FOR DISTRIBUTED TRAINING OF DEEP LEARNING MODELS

(71) Applicant: Movidius Limited, Schiphol-Rijk (NL)

(72) Inventor: David Moloney, Dublin (IE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 18/449,662

(22) Filed: Aug. 14, 2023

(65) Prior Publication Data

US 2024/0013056 A1    Jan. 11, 2024

Related U.S. Application Data

(63) Continuation of application No. 18/145,004, filed on Dec. 21, 2022, now Pat. No. 11,769,059, which is a (Continued)

(51) Int. Cl.
*G06E 1/00* (2006.01)
*G06E 3/00* (2006.01)
(Continued)

(52) U.S. Cl.
CPC ............ *G06N 3/084* (2013.01); *G06F 18/214* (2023.01); *G06N 3/045* (2023.01); *G06N 3/08* (2013.01);
(Continued)

(58) Field of Classification Search
CPC .......... G06N 3/084; G06N 3/045; G06N 3/08; G06N 3/0454; G06F 18/214; H04L 67/10; G06K 9/6256; G06E 3/00
(Continued)

(56) References Cited

U.S. PATENT DOCUMENTS 8,311,967 B1    11/2012    Lin et al.
8,521,664 B1    8/2013    Lin et al.
(Continued)

FOREIGN PATENT DOCUMENTS

CN    104992430 A    10/2015
CN    105160397 A    12/2015
(Continued)

OTHER PUBLICATIONS

Emilliano Miluzzo et al. "Darwin phones," Proceedings of the 8th International Conference on Mobile Systems, Applications, and Services, Jun. 15, 2012, 16 pages.
(Continued)

*Primary Examiner* — Marceau Milord
(74) *Attorney, Agent, or Firm* — Hanley, Flight & Zimmerman, LLC

(57) ABSTRACT

Systems and methods for distributed training of deep learning models are disclosed. An example local device to train deep learning models includes a reference generator to label input data received at the local device to generate training data, a trainer to train a local deep learning model and to transmit the local deep learning model to a server that is to receive a plurality of local deep learning models from a plurality of local devices, the server to determine a set of weights for a global deep learning model, and an updater to update the local deep learning model based on the set of weights received from the server.

20 Claims, 9 Drawing Sheets

Related U.S. Application Data continuation of application No. 16/326,361, filed as application No. PCT/IB2017/055024 on Aug. 19, 2017, now Pat. No. 11,580,380.

(60) Provisional application No. 62/377,094, filed on Aug. 19, 2016.

(51) Int. Cl.

| | | |
|---|---|---|
| *G06F 18/214* | (2023.01) | |
| *G06N 3/045* | (2023.01) | |
| *G06N 3/08* | (2023.01) | |
| *G06N 3/084* | (2023.01) | |
| *G06V 10/44* | (2022.01) | |
| *G06V 10/764* | (2022.01) | |
| *G06V 10/82* | (2022.01) | |
| *G06V 10/94* | (2022.01) | |
| *G06V 10/96* | (2022.01) | |
| *H04L 67/10* | (2022.01) | |

(52) U.S. Cl.
CPC .......... *G06V 10/454* (2022.01); *G06V 10/764* (2022.01); *G06V 10/82* (2022.01); *G06V 10/95* (2022.01); *G06V 10/96* (2022.01); *H04L 67/10* (2013.01)

(58) Field of Classification Search
USPC .......................................................... 706/15
See application file for complete search history.

(56) References Cited

U.S. PATENT DOCUMENTS

| | | | |
|---|---|---|---|
| 9,639,777 B1 | 5/2017 | Moloney et al. | |
| 10,402,469 B2 | 9/2019 | McMahan et al. | |
| 11,170,309 B1 | 11/2021 | Stefani et al. | |
| 11,580,380 B2* | 2/2023 | Moloney | G06V 10/454 |
| 11,595,274 B1* | 2/2023 | Nagaraju | H04L 41/14 |
| 11,610,156 B1* | 3/2023 | Nagaraju | G06N 3/04 |
| 11,620,549 B2* | 4/2023 | Sanchez | G06N 5/04 |
| | | | 706/12 |
| 11,720,955 B2* | 8/2023 | Chuah | G06Q 30/06 |
| | | | 705/26.3 |
| 11,769,059 B2* | 9/2023 | Moloney | G06N 3/08 |
| | | | 706/15 |
| 2007/0089174 A1* | 4/2007 | Bader | H04L 67/563 |
| | | | 726/32 |
| 2014/0067738 A1 | 3/2014 | Kingsbury | |
| 2014/0279741 A1 | 9/2014 | Sow et al. | |
| 2014/0349269 A1 | 11/2014 | Canoy et al. | |
| 2014/0351374 A1 | 11/2014 | Canoy | |
| 2015/0242760 A1* | 8/2015 | Miao | G06N 20/00 |
| | | | 706/12 |
| 2015/0254555 A1 | 9/2015 | Williams, Jr. et al. | |
| 2015/0324686 A1 | 11/2015 | Julian et al. | |
| 2015/0324690 A1 | 11/2015 | Chilimbi et al. | |
| 2015/0356461 A1 | 12/2015 | Vinyals et al. | |
| 2015/0363634 A1 | 12/2015 | Yin et al. | |
| 2016/0063393 A1 | 3/2016 | Ramage et al. | |
| 2016/0379115 A1 | 12/2016 | Burger et al. | |
| 2017/0109322 A1* | 4/2017 | McMahan | G06N 20/00 |
| 2017/0147920 A1 | 5/2017 | Huo et al. | |
| 2018/0053042 A1 | 2/2018 | Philbin et al. | |
| 2018/0210874 A1 | 7/2018 | Fuxman et al. | |
| 2018/0232528 A1* | 8/2018 | Williamson | G06N 5/025 |
| 2018/0350050 A1 | 12/2018 | Finlayson et al. | |
| 2019/0180195 A1 | 6/2019 | Terry et al. | |
| 2019/0180196 A1 | 6/2019 | Terry et al. | |
| 2020/0044801 A1 | 2/2020 | Wang et al. | |

FOREIGN PATENT DOCUMENTS

| | | | |
|---|---|---|---|
| CN | 105378762 | A | 3/2016 |
| CN | 105447866 | A | 3/2016 |
| CN | 105488515 | A | 4/2016 |
| CN | 105531725 | A | 4/2016 |
| CN | 105630882 | A | 6/2016 |
| CN | 105678332 | A | 6/2016 |
| GB | 201520932 | | 1/2016 |
| JP | 2013073301 | A | 4/2013 |
| KR | 20160013107 | A | 2/2016 |
| KR | 20160034814 | A | 3/2016 |
| WO | 2015126858 | A1 | 8/2015 |

OTHER PUBLICATIONS

Emilliano Miluzzo et al. "Vision: mClouds-computing on clouds of mobile devices," Proceedings of the 3rd ACM Workshop on Mobile Cloud Computing and Services (MCS'12), Jun. 25, 2012, 5 pages.

European Patent Office, "Extended European Search Report," issued in connection with European patent Application No. 23209185.0-1203, dated Feb. 15, 2024, 8 pages.

International Searching Authority, "International Search Report," issued in connection with PCT No. PCT/IB2021/055024, Dec. 12, 2017, 3 pages.

International Searching Authority, "Written Opinion of the International Searching Authority," issued in connection with International Patent Application No. PCT/IB2017/055024, dated Dec. 12, 2017, 5 pages.

International Searching Authority, "International Preliminary Report on Patentability," issued in connection with PCT No. PCT/IB2021/055024, Feb. 19, 2019, 6 pages.

European Patent Office, "Communication pursuant to Article 94(3) EPC," issued in connection with European patent application No. 17771869.9, Feb. 7, 2020, 5 pages.

European Patent Office, "Communication Pursuant to Article 94(3) EPC," issued in connection with application No. 17771869.9 dated May 14, 2021, 5 pages.

United States Patent and Trademark Office, "Non-Final Action" issued in U.S. Appl. No. 16/326,361 on Jun. 27, 2022 (18 pages).

The State Intellectual Property Office If the People's Republic of China, "The First Office Action," issued in connection with Application No. 201780064431.6, dated Sep. 5, 2022, 4 Pages.

United States Patent and Trademark Office, "Notice of Allowance" issued in U.S. Appl. No. 16/326,361 on Oct. 13, 2022 (7 pages).

Korean Intellectual Property Office, "Request for the Submission of an Opinion," issued in connection with Korean Patent Application No. 20197007900, dated Oct. 20, 2022, 18 pages. (English translation included).

Korean Intellectual Property Office, "Notice of Preliminary Rejection," issued in connection with Korean Patent Application No. 10-2019-7007900 issued on Oct. 20, 2022, 19 pages (English language machine translation included. ).

Korean Intellectual Property Office, "Written Decision on Registration," issued in connection with Korean Patent Application No. 20197007900, dated Apr. 19, 2023, 5 pages. (English translation included).

United States Patent and Trademark Office, "Notice of Allowance and Fee(s) Due," issued in connection with U.S. Appl. No. 18/145,004, mailed on May 12, 2023, 8 pages.

United States Patent and Trademark Office, "Notice of Allowance and Fee(s) Due," issued in connection with U.S. Appl. No. 18/145,004, mailed on May 19, 2023, 1 page.

The State Intellectual Property Office of People's Republic of China, "Second Office Action," issued in connection with Chinese Patent Application No. 201780064431.6, dated May 20, 2023, 20 pages. [English translation Included].

The State Intellectual Property Office of People's Republic of China, "Supplementary search," issued in connection with Chinese Patent Application No. 201780064431.6, dated May 20, 2023, 2 pages.

The State Intellectual Property Office of People's Republic of China, "Rejection decision," issued in connection with Chinese Patent Application No. 201780064431.6, dated Sep. 29, 2023, 24 pages. [Machine English translation Included].

(56) References Cited

OTHER PUBLICATIONS

European Patent Office, "Summons to attend Oral Proceedings pursuant to Rule 115(1) EPC," issued in connection with European patent Application No. 17 771 869.9-1203, on Oct. 18, 2023, 7 pages.

The State Intellectual Property Office of People's Republic of China, "Correction notice," issued in connection with Chinese Patent Application No. 202311499504.8, dated Dec. 11, 2023, 1 page.

European Patent Office, "Brief Communication," issued in connection with European Patent Application No. 17 771 869.9-1203, mailed on Apr. 26, 2024, 3 pages.

European Patent Office, "Communication under Rule 71(3) EPC," issued in connection with European Application No. 17771869.9, dated Jun. 28, 2024, 11 pages.

\* cited by examiner

| DeepCrowd API call | Function | Returns |
|---|---|---|
| establish_secure_connection | Establish secure connection with device | 1 and data if API-call established 0 if API-call failed |
| shutdown_secure_connection | Shut down secure connection with device | 1 and data if API-call established 0 if API-call failed |
| query_device_permissions | Allows console/operator to determine rights to access data | 1 and data if API-call established 0 if API-call failed |
| query_device_state | Allows console/operator to determine to access data | 1 and data if API-call established 0 if API-call failed |
| upload_network | Upload updated network to device from server | 1 and data if API-call established 0 if API-call failed |
| download_network | Download updated network from device to server | 1 and data if API-call established 0 if API-call failed |

FIG. 7

SYSTEMS AND METHODS FOR DISTRIBUTED TRAINING OF DEEP LEARNING MODELS

RELATED APPLICATIONS

This patent arises from a continuation of U.S. patent application Ser. No. 18/145,004, (now U.S. Pat. No. 11,769,059), entitled SYSTEMS AND METHODS FOR DISTRIBUTED TRAINING OF DEEP LEARNING MODELS, which was filed on Dec. 21, 2022, which is a continuation of U.S. patent application Ser. No. 16/326,361, (now U.S. Pat. No. 11,580,380) entitled SYSTEMS AND METHODS FOR DISTRIBUTED TRAINING OF DEEP LEARNING MODELS, which was filed on Feb. 18, 2019. U.S. patent application Ser. Nos. 18/145,004 and 16/326,361 are hereby incorporated by reference in their entirety. Priority to U.S. patent application Ser. Nos. 18/145,004 and 16/326,361 is hereby claimed.

FIELD OF THE DISCLOSURE

This present application relates generally to machine learning and more particularly to systems and methods for distributed training of deep learning models.

BACKGROUND

Deep learning is a branch of machine learning that provides state-of-the-art performance in many applications, including computer vision, speech processing, natural language processing, and audio recognition. Deep learning uses a computational model that resembles the architecture of neurons in brains. In particular, the computational model of deep learning, hereinafter referred to as the deep learning model, uses layers of "artificial neurons" to model the desired functionality of the computational model. Each of the artificial neurons are associated with one or more weights, which can be adjusted (e.g., trained) to provide a desired functionality when the artificial neurons are operated in the aggregate.

Weights in a deep learning model can be trained using training data. The training data can include an input data and a label associated with the input data. The weights in the deep learning model can be trained (or determined) in such a way that, when the deep learning model receives an input data, the deep learning model outputs a label corresponding to the input data.

BRIEF DESCRIPTION OF DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 7 illustrates an example Application Programming Interface (API) supported by the local devices and the host server of FIG. 1 in accordance with some embodiments.

DETAILED DESCRIPTION

Figure 1:
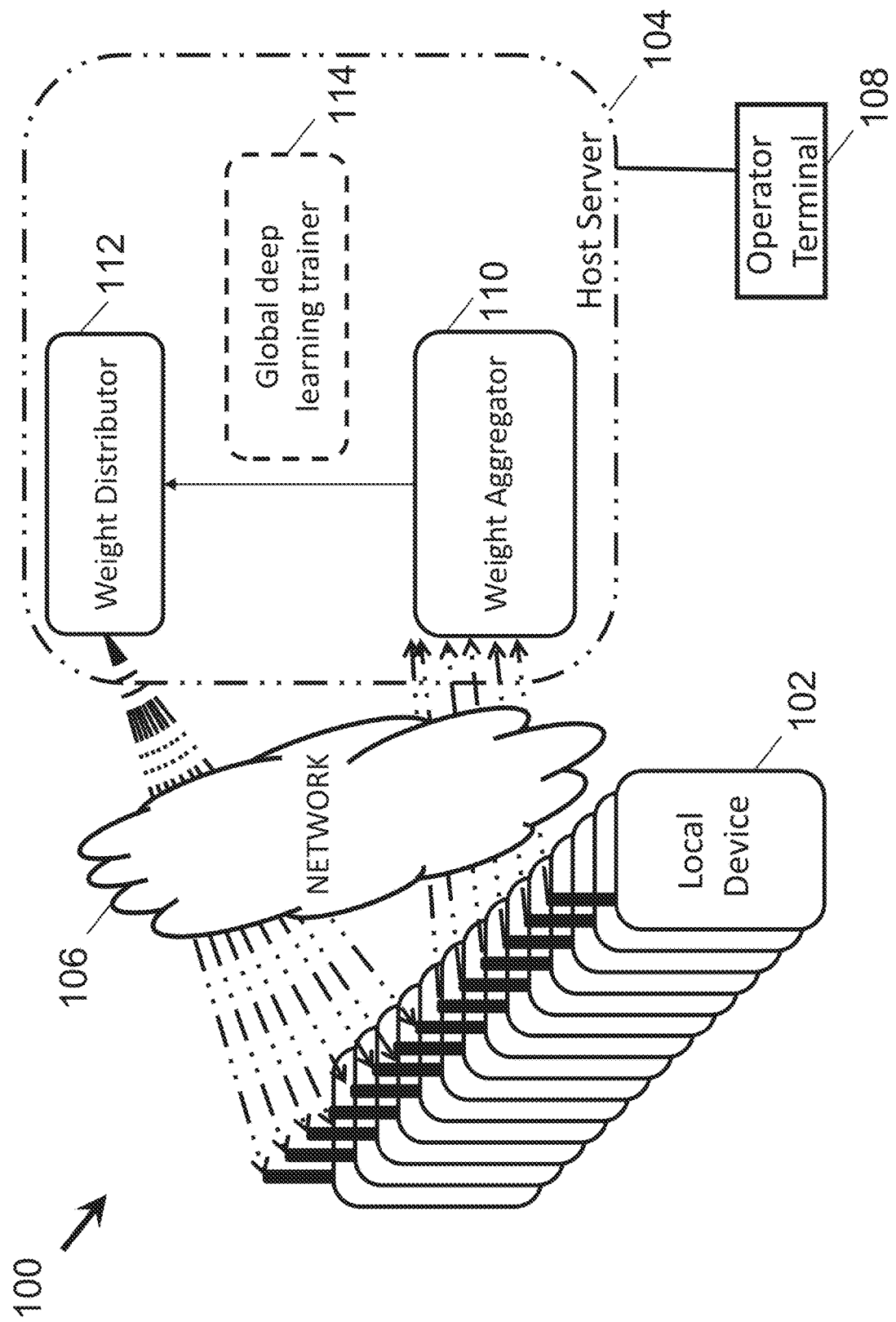
FIG. 1 is a block diagram of an example distributed deep learning training platform, including a host server and a plurality of local devices, in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are examples, and that it is contemplated that there are other systems and methods that are within the scope of the disclosed subject matter.

One of the challenges in deep learning is training weights in a deep learning model. Weights in a deep learning model are generally trained using a centralized deep learning training platform. A centralized deep learning training platform includes a host server and a plurality of local devices. Each of the local devices can gather input data and transmit the input data to the host server. The host server can aggregate the input data received from each of the local devices, create a training data set from the aggregated input data by associating desired labels with the aggregated input data, and train a deep learning model (e.g., the weights for the deep learning model) using the training data set.

Unfortunately, a centralized deep learning training platform is computationally expensive, especially when the training data set is large, because it is difficult to determine and associate correct labels for input data in the training data set. Such a massive labelling effort is realistic only for entities with a large amount of resources. Also, a centralized deep learning training platform requires a large amount of data communication bandwidth because the host server has to receive a large amount of input data from a large number of local devices. In addition, a centralized deep learning training platform is prone to privacy compromises because local devices have to share the raw input data, which may include private information, with the host server.

To address these issues with centralized training, the systems and methods disclosed herein provide a distributed training platform for training a deep learning model. An example distributed training platform includes a host server and a plurality of local devices. Each of the plurality of local devices is configured to receive input data. In contrast to the centralized approach, each of the example local devices in the distributed system is configured to locally label the input data to create a local training data set, and use the local training data set to train a local deep learning model. Because the training data set is created locally at the local devices, the host server does not need to determine and associate labels to a large amount of input data. Therefore, the host server is relieved from the computationally expensive process of creating a large training data set.

Once the local deep learning model is trained (e.g., weights of the local deep learning model are determined), each of the local devices can transmit the weights of its local deep learning model to a host server. This is in contrast to the centralized approach in which the local device sent the raw input data to the host server. Because the input data itself is not sent to the host server, the local device is not forced to share private information in the input data, thereby reducing the possibility of privacy compromises.

When the host server receives the weights from the local devices, the host server can aggregate the weights to determine the aggregated weights. The aggregated weights approximate the weights of a deep learning model that would have been obtained if the host server had trained the deep learning model using all training data sets used by the local devices. By leveraging the distributed computation of weights by the local devices, the host server can determine the approximated weights of a deep learning model, without actually training the deep learning model by itself. In some sense, the host server is crowd-sourcing the training of a deep learning model from the local devices.

In some examples, the disclosed distributed training platform is beneficial because (1) it allows the host server to learn a deep learning model that takes into account all available information (e.g., training data) and provide the globally-learned deep learning model to the local devices, and (2) it allows the local devices to adopt the globally-learned deep learning model and also adjust it to take into account any local variations. Therefore, the disclosed distributed training platform provides a deep learning paradigm for "training globally, adapting locally."

In some embodiments, the distributed deep learning training platform can be used to train deep learning models for auto white balance or other image processing systems for processing primary raw input images. In other embodiments, the distributed deep learning training platform can be used to train deep learning models for detecting a status of a movement (e.g., at rest, walking, or running) using an accelerometer input signal. In other embodiments, the distributed deep learning training platform can be used to train deep learning models for detecting audio commands or events. The disclosed deep learning training platform may, alternatively, be used for any task in which machine learning is desired.

FIG. 1 is a block diagram of an example distributed deep learning training platform 100 in accordance with some embodiments. The example platform 100 includes a plurality of example local devices 102 communicatively coupled with an example host server 104 via an example network 106. According to the illustrated example, the host server 104 is coupled with an example operator terminal 108 to allow an operator to control operation of the host server 104. For clarity, throughout this disclosure, reference is made to a single local device 102, which may be representative of one or more of the plurality of local devices 102.

The example local device 102 is a computing device that receives an input data, trains a local deep learning model, and transmits the local deep learning model (or characteristics thereof) to the host server. According to the illustrated example, the input data is received directly at the first local device without passing through the example host server 104. As used herein, stating that input data is directly received at the local device 102 is defined to mean receiving data directly or indirectly from a data source, wherein the data does not pass through a host server (e.g., the host server 104) that is performing deep learning training. In some examples, the input data may be received from a sensor (e.g., a measurement device, a data input, a data collector, a user interface that accepts user input, etc.) of the local device 102, may be received from such a sensor communicatively coupled (e.g., coupled directly to the local device, coupled to the local device 102 via one or more intermediate devices (e.g., an intermediate device other than the host server 104), etc.) to the local device 102, etc.

Figure 2:
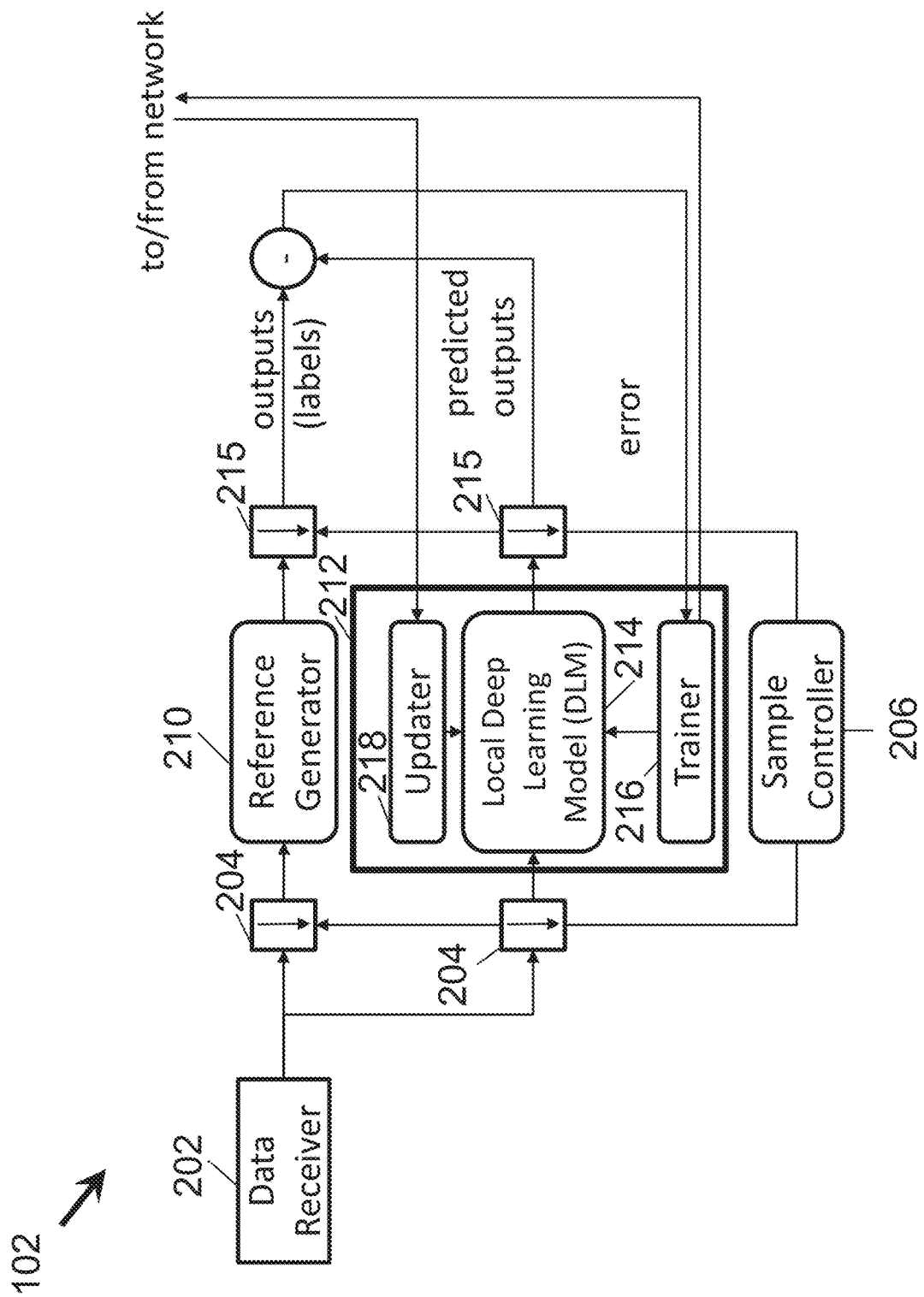
FIG. 2 is a block diagram of an example implementation of the local device in accordance with some embodiments.

The example device 102 is described in further detail in conjunction with FIG. 2.

The example host server 104 aggregates the local deep learning model data received from the plurality of local devices 102 and distributes the aggregated results back to the plurality of local devices 102. The example host server 104 includes an example weight aggregator 110, an example weight distributor 112, and an example global deep learning trainer 114.

The example weight aggregator 110 receives the weights of local deep learning models from the plurality of local devices 102 and aggregates the weights to determine aggregated weights. The example weight aggregator 110 aggregates the weights by averaging corresponding weights received from the local devices 102. For example, when the weight aggregator 110 receives a first set of weights (a_1, b_1, c_1) from a first local device 102 and a second set of weights (a_2, b_2, c_2) from a second local device 102, the example weight aggregator 110 averages the corresponding weights from the local devices 102 to determine the aggregated weights: ((a_1+a_2)/2, (b_1+b_2)/2, (c_1+c_2)/2). In some examples, the weight aggregator 110 can simplify the weight aggregation process by aggregating only the weights associated with deeper layers in the deep learning model.

Once the weight aggregator 110 determines the aggregated weights, the example weight aggregator 110 provides the aggregated weights to the example weight distributor 112.

The example weight distributor 112 provides the aggregated weights to the local devices 102 so that the local devices 102 can update their own local deep learning models using the aggregated weights. The example weight distributor 112 includes a network interface (e.g., a wired network interface and/or a wireless network interface) for transmitting the aggregated weights to the plurality of local devices 102 via the example network 106. Alternatively, the weight distributor 112 may communicate the aggregated weights to the local devices via a direct connection, via a removable storage device, etc.

The example host server 104 includes the example global deep learning trainer 114 to train a global deep learning model using training data. The global deep learning trainer 114 can be configured to train the global deep learning model using a variety of training techniques, including, for example, back propagation, contrastive divergence, alternative direction method of multipliers (ADMM), and/or tensor factorization. For example, the host server 104 may include the global deep learning trainer 114 when the local devices 102 will provide input data to the example host server 104. Alternatively, in some examples, the host server 104 may not include the global deep learning trainer 114.

In some examples, the weight aggregator 110 provides the aggregated weights to the global deep learning trainer 114 in addition to or as alternative to providing the aggregated weights to the weight distributor 112. For example, the global deep learning trainer 114 may update the aggregated weights with any training data available at the host server 104, and provide the updated aggregated weights to the weight distributor 112 for distribution to the local devices 102.

In some examples, the host server 104 and the plurality of local devices 102 collaborate with one another to create a global deep learning model that takes into account all training data sets available to all local devices 102 and/or the host server 104.

The example network 106 is a wide area network that communicatively couples the local devices 102 to the host server 104. For example, the network 106 may be the internet. Alternatively, any other type of network may be utilized such as, for example, a local area network, a wireless network, a wired network, or any combination of network(s).

The example operator terminal 108 is a computing device providing a user interface in which a human operator can interaction with and control operation of the host server 104. For example, the human operator may review the weight aggregation process, view an operation status, etc. An example user interface for the operator terminal 108 is described in conjunction with FIG. 6.

In an example operation of the platform 100, the local devices 102 receive input data (e.g., from sensors or other inputs coupled to the local devices 102). To ensure privacy, limit bandwidth usage, etc. the local devices 102 do not transmit the input data to the host server 104 according to this example. The example local devices 102 train respective local deep learning models using the input data. The example local devices 102 transmit the weights and/or other details of the respective local deep learning models to the example host server 104. The example weight aggregator 110 of the example host server 104 aggregates the weights to develop a global set of weights. The example weight distributor 112 distributes the aggregated weights back to the local devices 102 to update the respective local deep learning models with the globally aggregated weights. For example, the local devices 102 may then utilize the globally updated respective local deep learning models to classify test data (e.g., data that has not been classified or for which classification is desired).

FIG. 2 is a block diagram of an example implementation of the local device 102 of FIG. 1. The example local device 102 includes an example data receiver 202; example input samplers 204, an example sample controller 206, an example reference generator 210; an example deep learner 212 which includes an example deep learning model 214, example output samplers 215, an example trainer 216, and an example updater 218.

The example data receiver 202 receives input data to be processed by the example local device 102. For example, the data receiver 202 may be a sensor, a measurement device, a network interface, a user input device, a connection for a removable storage device, etc. For example, the input data may be received from an image sensor, an audio sensor, a data communication channel, a user interface, and/or any source that is capable of providing data to the local device 102.

According to the illustrated example, the data receiver 202 provides the received input data to the example reference generator 210 and the example deep learner 212 via the example input samplers 204 that are controlled by the example sample controller 206. For example, the input data can be sampled by the input samplers 204 to reduce the size of the input data and to simplify the training process.

The example sample controller 206 determines how the input data should be sampled. In some examples, the sample controller 206 is configured to select one or more random segments of the input data having a predetermined size and provide the random segment(s) to the example reference generator 210 and the example deep learner 212. For example, the sample controller 206 may be implemented using a linear-feedback shift register (LFSR) that is configured to select a pseudo-random portion of the input data. The pseudo-random selection of the input data allows the example trainer 216 of the example deep learner 212 to use the appropriate distribution of samples for training the local deep learning model 214. In some implementations, the LFSR can be implemented in hardware, such as a programmable hardware. In other implementations, the LFSR can be implemented as a software module including a set of computer instructions stored in a memory device.

For example, if the input data is an image(s), the sample controller 206 may randomly crop one or more portions of the input image and provide the cropped portion(s) to the reference generator 210 and the deep learner 212. In other instances, when the input data is an image, the sample controller 206 may down-sample the input image and provide the down-sampled input image to the reference generator 210 and the deep learner 212.

The example reference generator 210 processes the input data to determine a label associated with the input data (or the sampled input data). For example, the input data to be used for training may include an indication of a label, classification, result, etc. In some examples, the reference generator 210 may receive user input that identifies a label for input data (e.g., input data may be presented via a user interface and a user may select an appropriate label for the data). The reference generator 210 outputs the labelled data for comparison with the result of applying the input data to the example deep learning model 214. The output of the reference generator 210 may be sampled by the example output sampler 215.

The example local deep learning model 214 receives the input data (or sampled input data) and processes the input data to determine an output. For example, the local deep learning model 214 may operate using the same set of labels utilized by the reference generator 210. The output of the deep learning model 214 may be sampled by the example output sampler 215. The local deep learning model 214 may include, for example, an implementation of deep neural networks, convolutional deep neural networks, deep belief networks, recurrent neural networks, etc.

According to the illustrated example, before the trainer 216 analyses the (1) the label determined by the reference generator 210 and (2) the output of the deep learning model 214, the label and the output of the deep learning model 214 are sampled by the output samplers 215. For example, the output samplers 215 may be utilized when the amount of training to be performed is otherwise too onerous for, for example, an embedded platform in terms of computational intensity, power dissipation or both. For example, image and video input data may present computational complexity that may be reduced by sampling the outputs.

The example trainer 216 determines a difference between (1) the label determined by the reference generator 210 and (2) the output of the example deep learning model 214. The example trainer uses the difference to train/adjust the example local deep learning model 214. For example. The trainer 216 may train the local deep learning model 214 using a variety of training techniques, including, for example, back propagation, contrastive divergence, alternative direction method of multipliers (ADMM), and/or tensor factorization.

According to the illustrated example, the trainer 216 transmits the weights associated with the local deep learning model 214 to the host server 104. Alternatively, the example trainer 216 may transmit the local deep learning model 214 and/or the input data to the example host server 104. In some implementations, the trainer 216 transmits the weights when the local device 102 is requested to send the weights to the host server 104. Alternatively, the trainer 216 may transmit the weights when the deep learner 212 has completed the training of the local deep learning model 214.

In some examples, when the trainer 216 transmits the weights to the host server 104, the trainer 216 can also send (1) the number of training intervals (e.g., iterations of training) performed by the deep learner 212 and/or (2) time-series data describing error convergence over time. In some cases, if there was any input data that was difficult to train on the local deep learning model 214, the trainer 216 also transmits that input data, or one or more labels that were output by the local deep learning model 214. For example, the trainer 216 may determine that an input data was challenging to train on the local deep learning model 214 when the local deep learning model 214 outputs two or more labels with similar confidence levels for the input data.

The example updater 218 receives the aggregated weights from the host server 104 and updates the weights of the local deep learning model 214 with the aggregated weights. For example, the updater 218 can replace the weights of the local deep learning model 214 with the aggregated weights. As another example, the updater 218 can replace the weights of the local deep learning model 214 with a weighted average of (1) the weights of the local deep learning model 214 and (2) the aggregated weights received from the host server 104.

In some examples, the reference generator 210 and the deep learner 212 process new input data as it becomes available. When the trainer 216 determines that training of the local deep learning model 214 is completed, the deep learner 212 can be configured to stop additional training. For example, the trainer 216 may stop additional training when determining that the accuracy of the deep learning model 214 has reached a threshold level, when the accuracy has substantially stopped increasing, etc. Alternatively, the trainer 216 may continue training as long as additional input data and labels from the reference generator 210 are presented.

Figure 4:
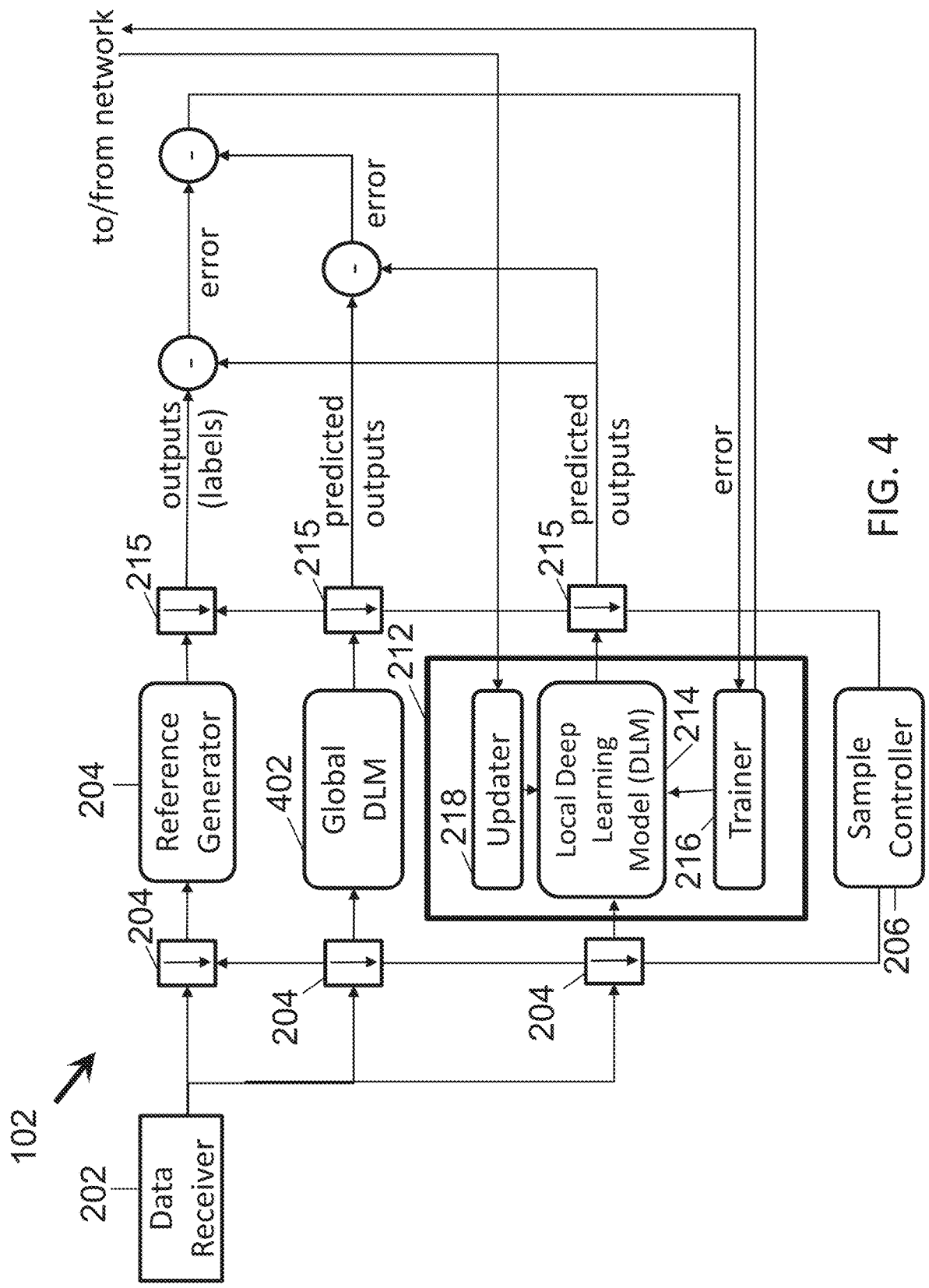
FIGS. 4-5 are block diagrams of example implementations of the local device in accordance with some embodiments

While an example manner of implementing the local device 102 of FIG. 1 is illustrated in FIG. 2, one or more of the elements, processes and/or devices illustrated in FIG. 4 may be combined, divided, re-arranged, omitted, eliminated and/or implemented in any other way. Further, the example data receiver 202, the example input samplers 204, the example sample controller 206, the example reference generator 210, the example trainer 216, the example updater 218 (and/or, more generally, the example deep learner 212), the example output samplers 215, and/or, more generally, the example local device 102 of FIG. 1 may be implemented by hardware, software, firmware and/or any combination of hardware, software and/or firmware. Thus, for example, any of the example data receiver 202, the example input samplers 204, the example sample controller 206, the example reference generator 210, the example trainer 216, the example updater 218 (and/or, more generally, the example deep learner 212), the example output samplers 215, and/or, more generally, the example local device 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data receiver 202, the example input samplers 204, the example sample controller 206, the example reference generator 210, the example trainer 216, the example updater 218 (and/or, more generally, the example deep learner 212), and/or the example output samplers 215 is/are hereby expressly defined to include a non-transitory computer readable storage device or storage disk such as a memory, a digital versatile disk (DVD), a compact disk (CD), a Blu-ray disk, etc. including the software and/or firmware. Further still, the example local device 102 of FIG. 1 may include one or more elements, processes and/or devices in addition to, or instead of, those illustrated in FIG. 2, and/or may include more than one of any or all of the illustrated elements, processes and devices.

Figure 3:
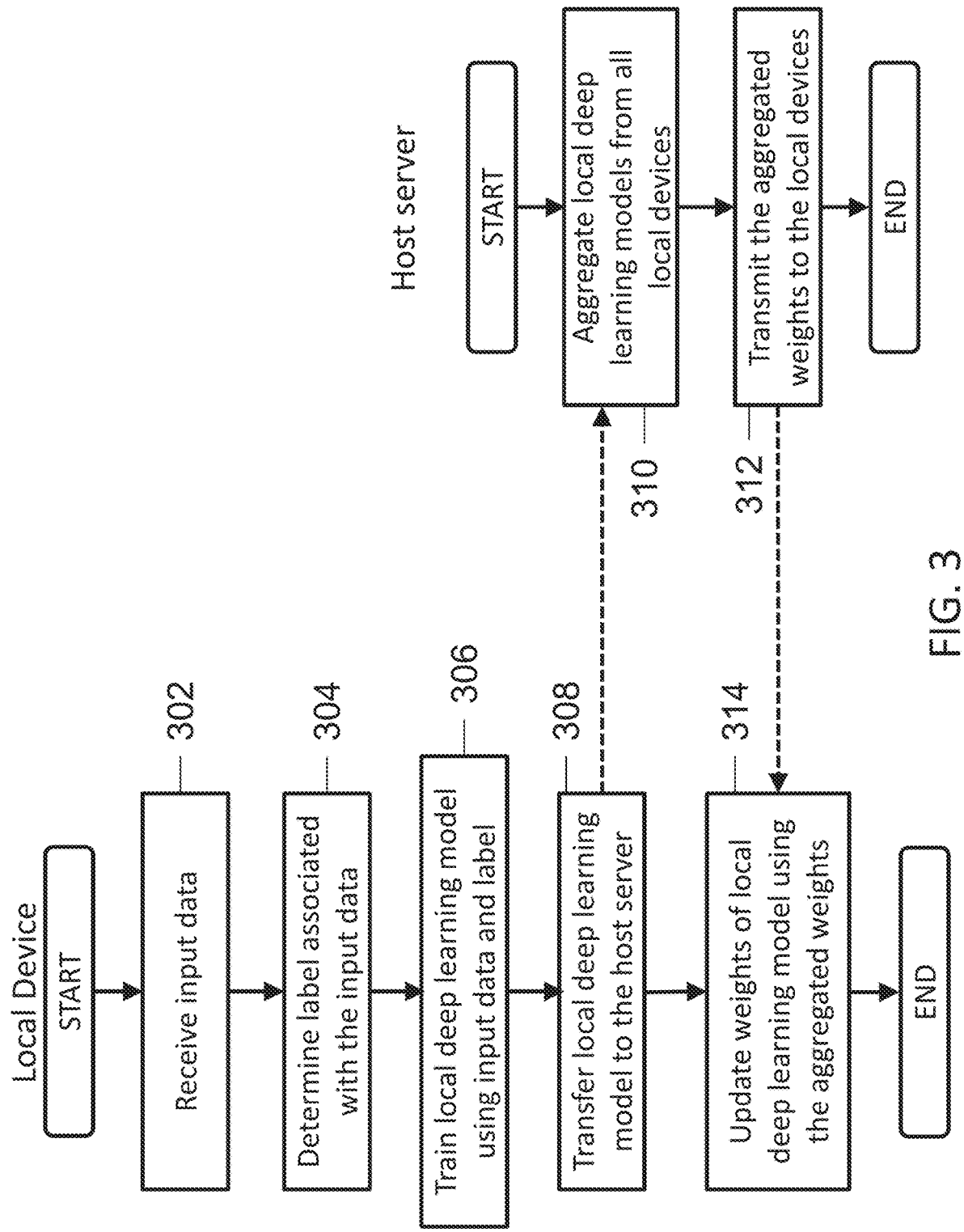
FIG. 3 is a flowchart representative of machine readable instructions which may be executed to implement the local device and the host server of FIGS. 1 and/or 2.

A flowchart representative of example machine readable instructions for implementing the local device 102 of FIGS. 1 and/or 2 and/or the host server 104 of FIG. 1 is shown in FIG. 3. In this example, the machine readable instructions comprise a program for execution by a processor such as the processor 812 and/or the processor 912 shown in the example processor platform 800 and/or the example processor platform 900 discussed below in connection with FIGS. 8 and 9. The program may be embodied in software stored on a non-transitory computer readable storage medium such as a CD-ROM, a floppy disk, a hard drive, a digital versatile disk (DVD), a Blu-ray disk, or a memory associated with the processor 812, 912, but the entire program and/or parts thereof could alternatively be executed by a device other than the processor 812, 912 and/or embodied in firmware or dedicated hardware. Further, although the example program is described with reference to the flowchart illustrated in FIG. 3, many other methods of implementing the example local device 102 and/or the host server 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 3 begins at block 302 when the example data receiver 202 of the example local device 102 receives input data. The input data can be received from a variety of data sources including, for example, an image sensor, an audio sensor, a data communication channel, a user interface, and/or any source that is capable of providing data to the first local device 102.

The example reference generator 210 determines a label associated with the input data (block 304). For example, the reference generator 210 may determines labels for the input data after sampling by the example input sampler 304 and the example sample controller 206. In some examples, the reference generator 210 may determine labels by causing the input data to be operated on a reference system. The reference system can be a target system to be modelled by the deep learning model. In other words, the reference system can refer to the input-output relationship (e.g., a transfer function) to be learned by the global DLM. In some embodiments, the reference system can be implemented in hardware as an integrated chip; in other embodiments, the reference system can be implemented as a software module that includes a set of computer instruction executable by a processor.

The example trainer 216 trains the example local deep learning model 214 (block 306). For example, according to the illustrated example of FIG. 2, the trainer 216 trains the deep learning model 214 based on a difference between the label indicated by the example reference generator 210 and an output of the input data applied to the example deep learning model 214.

The example trainer 216 of the local device 102 transmits the weights associated with the local deep learning model 214 to the host server 104 (block 308). For example, trainer 216 may transfer the weights in response to a request from the host server 104, may transfer the weights once the trainer 216 determines that the training of the local deep learning model 214 is completed, etc.

According to the illustrated example, the process of blocks 302-308 is carried out by multiple local devices 102 in parallel.

When the example weight aggregator 110 of the example host server 104 receives the weights from the local devices 102, the example weight aggregator 110 aggregates the received weights from the local devices 102 (block 310). According to the illustrated example, the weight aggregator 110 computes an average of the weights to determine the aggregated weights. In other examples, the weight aggregator 110 aggregates the weights by creating standard deviations for individual weights and filtering out outliers.

The example weight distributor 112 transmits the aggregated weights to the local devices 102 (block 312).

In some examples, in the event that there are multiple distributions for individual weights, outliers from these individual distributions can be filtered out by the weight aggregator 110 and separate derivative networks with differing weights, one for each of the filtered distributions, can be generated and the weight distributor 112 may transmit the respective weights back to the relevant sub-groups of the local devices 102.

When the updater 218 of the local device 102 receives the aggregated weights from the host server 104, the example updater 218 updates the weights of the local deep learning model 214 using the aggregated weights to take into account all of the local training data sets created by the plurality of local devices 102 (block 314). According to the illustrated example, updater 218 replaces the weights of the local deep learning model 214 with the aggregated weights so that the local devices 102 have access to the global deep learning model. In other examples, the updater 218 updates the weights of the local deep learning model 214 with a weighted average of (1) the weights of the local deep learning model 214 and (2) the aggregated weights received from the example host server 104.

The process of FIG. 3 then terminates. Alternatively, the process of FIG. 3 may restart at block 302, may restart at block 302 when new input data is received, etc.

FIG. 4 is a block diagram of another implementation of the local device 102. The implementation of the local device 102 of FIG. 4 is similar to the implementation of the local device 102 of FIG. 2, except that the local device 102 of FIG. 4 also includes a global deep learning model 402. The global deep learning model 402 is a deep learning model trained at the host server 104. When the updater 218 of the local device 102 of FIG. 4 receives the aggregated weights from the host server 104, the example updater 218 replaces the weights in the global deep learning model 402 using the received aggregated weights.

Because the global deep learning model 402 of FIG. 4 is trained using all information available to all local devices, the global deep learning model 402 may not be tailored to address the characteristics of local input data available to a particular local device 102. To address this issue, the trainer 216 trains and maintains the local deep learning model 214 that is configured to augment the global deep learning model 402. In particular, the local deep learning model 214 can be configured to capture the characteristics of local input data available to a particular local device 102 so that the global deep learning model 402 and the local deep learning model 214 can together capture both the global characteristics and the local variations of the training data.

The operation of the system in FIG. 4 is substantially similar to the operation of the system in FIG. 2 except input data is also provided to the global deep learning model 402 (e.g., via an input sampler 204). The example trainer 216 of the illustrated example of FIG. 4 determines a difference between (1) the label determined by the reference generator 210 and (2) a summation of the output of the local deep learning model 214 and an output of the global deep learning model 402. The example trainer 216 uses the difference to train the local deep learning model 214.

Figure 5:
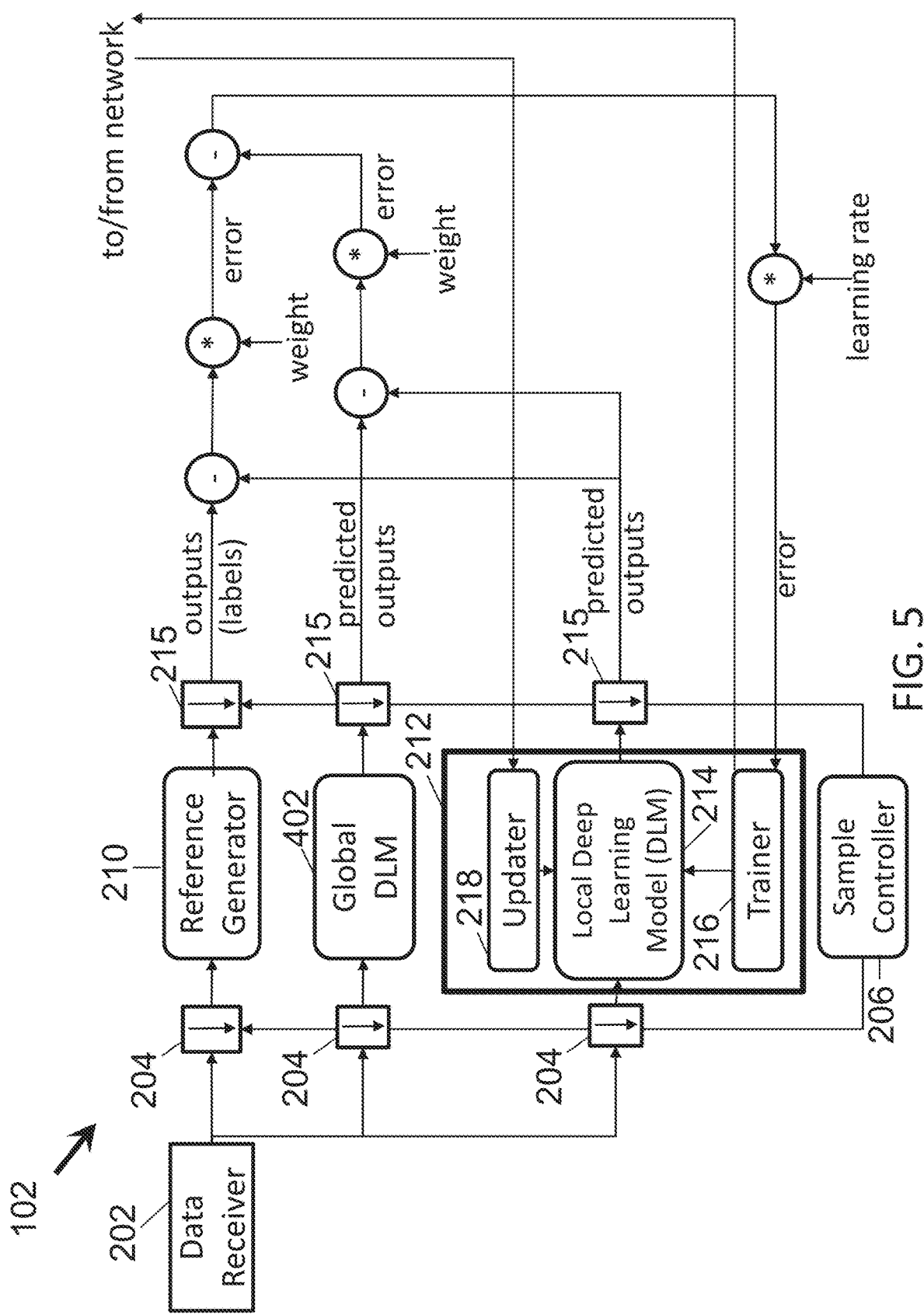

FIG. 5 is a block diagram of another implementation of the local device 102. The implementation of the local device 102 of FIG. 5 is similar to the implementation of the local device 102 of FIG. 3, except that the local device 102 of FIG. 5 also applies different weights in training the local deep learning model 214. For example, the outputs of the local deep learning model 214 and the global deep learning model 402 may be given different weights than the output of the reference generator 210 to control the influence of the models and the reference data on the training. Additionally or alternatively, different weights may be applied to each of the output of the local deep learning model 214 and the output of the global deep learning model 402.

Figure 6:
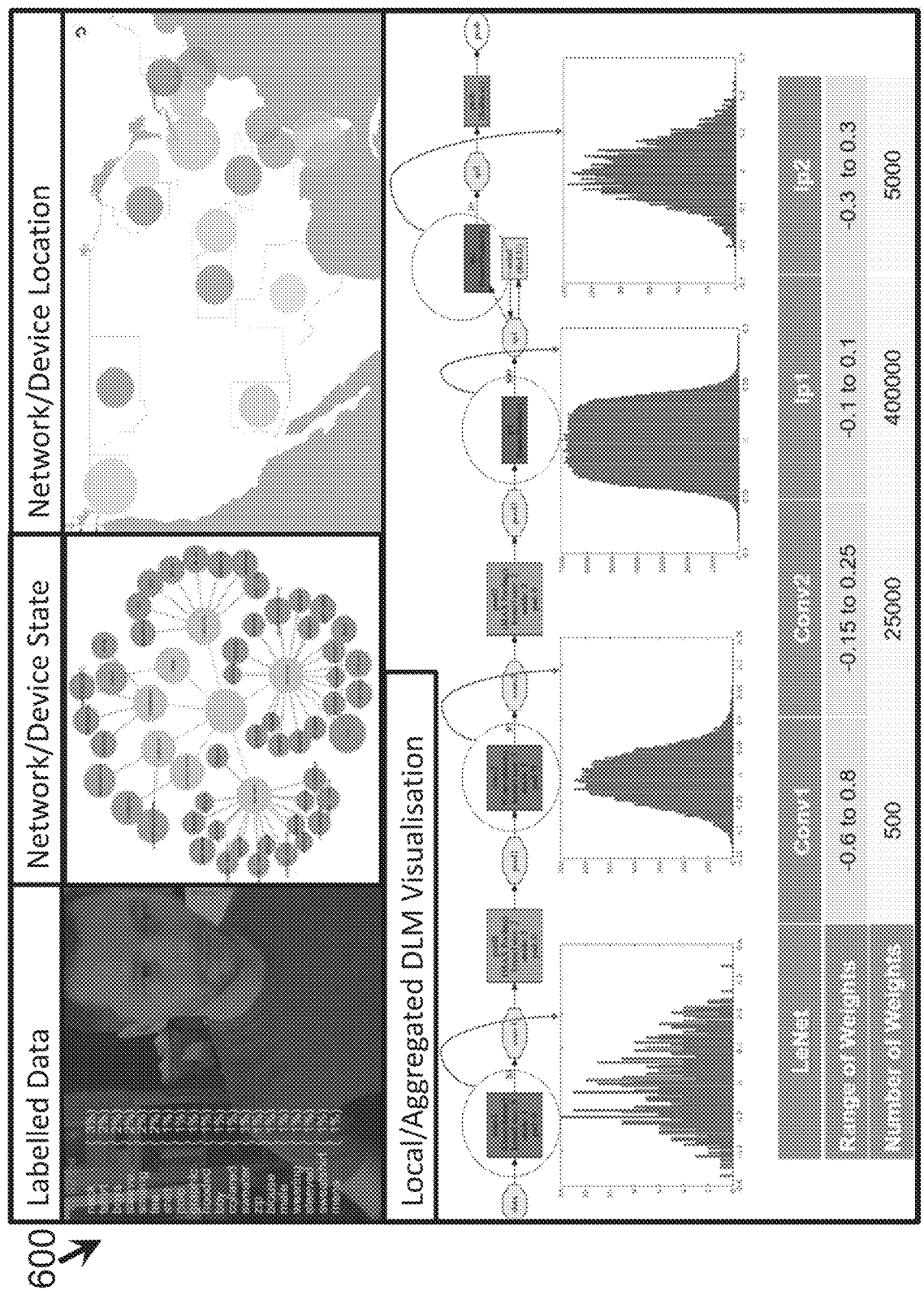
FIG. 6 illustrates an example layout of a user interface for the operator console of FIG. in accordance with some embodiments.

FIG. 6 illustrates an example user interface 600 that may be presented by the example operator terminal 108. The example user interface 600 presents a visualization of deep learning models down to the level of individual weights. The example user interface 600 may present a visualization of particular local devices 102 and clusters of local devices 102 and the active deep learning models operating there via a secure connection with the local devices 102. The secure connection may only allow bi-directional transmission of weights without other information (e.g., input data) via a simple Application Programming Interface (API) with example commands 700 listed in FIG. 7. The secure connection can enable secure authenticated communication with one of the local devices 102 or cluster of the local devices 102, and can transmit or receive the state of the local device 102, the local deep learning models 214 to be uploaded from the local device 102, and the global deep learning model(s). The secure connection can be closed down using one or more commands. The user interface 600 allows states of the local devices 102 as well as the precise geographical position for an authorized human operator to be visualized.

The user interface 600 and/or the operator terminal 108 allow a human operator of the host server 104 to select a weight aggregation strategy to be employed by the host server 104. For example, the user interface 600 may include a menu system (as shown in FIG. 6), external file, command-line option, and/or any other mechanisms. An operator can also specify the generation of derivative networks to be used to specialize across distributed local deep learning models 214 in the case where weights from the local devices 102 are found to have multiple distributions or to force aggregation of weights by averaging or other mathematical means where the operator judges that this is a reasonable trade off.

In some examples, the user interface 600 presents visualization of labelled data in the event it is shared with the host server 104 by local devices 102. For example, if the local deep learning model 214 of produces classification accuracies below a user-defined threshold in the case of the top N most likely classifications produced by the network, or for instance if the difference or standard deviation in the top N classifications are below a user-defined threshold, if an operator has opted-in for the sharing of labelled data, the local device 102 can upload labelled data to the host server 104 for visualization with the user interface 600.

Figure 8:
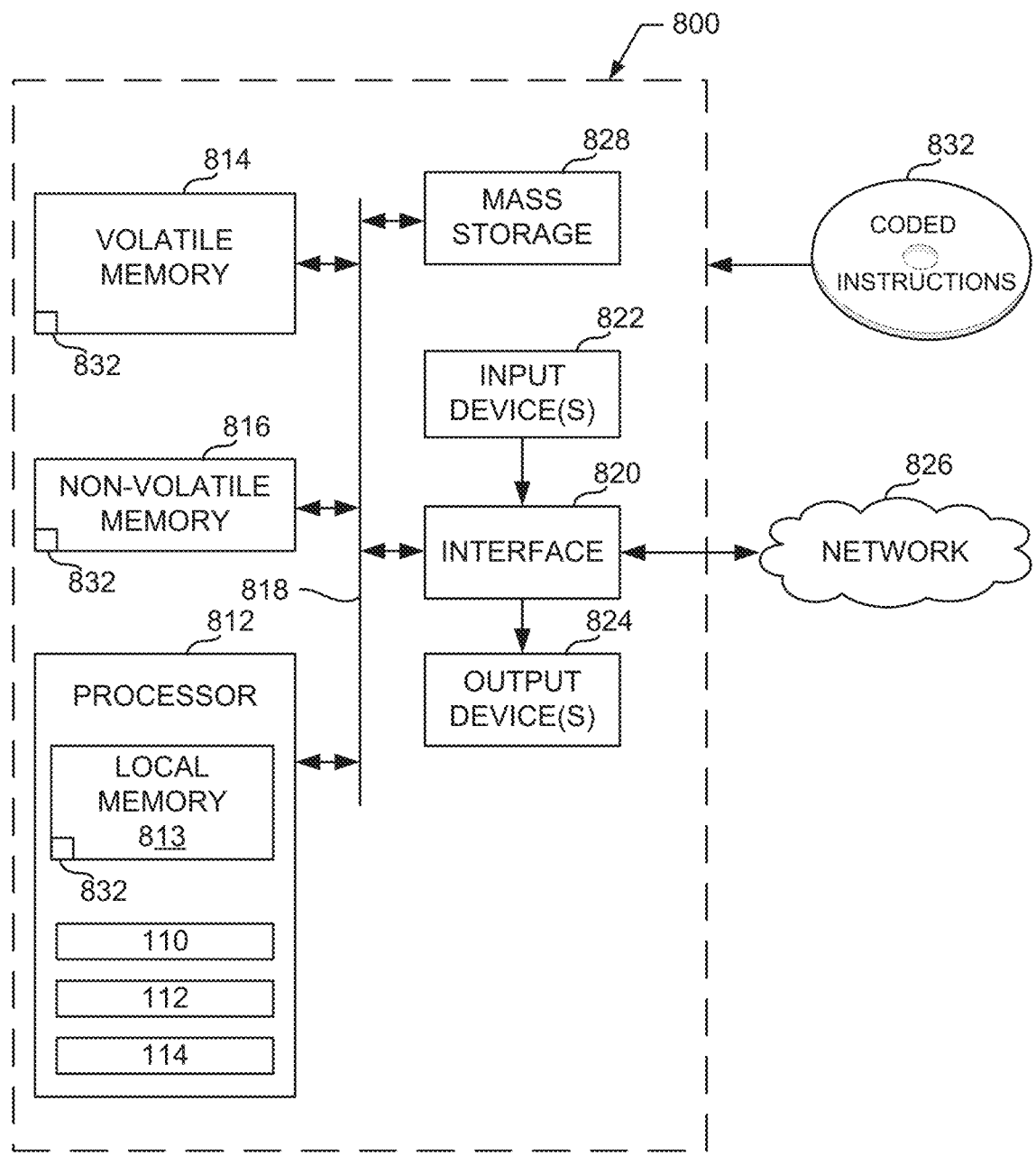
FIGS. 8-9 are block diagrams of example processing platforms structured to execute the instructions of FIG. 3 to implement the local device and the host server of FIGS. 1 and/or 2.

FIG. 8 is a block diagram of an example processor platform 800 capable of executing the instructions of FIG. 3 to implement the host server 104 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the example weight aggregator 110, the example weight distributor 112, and the example global trainer 114.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 3 may be stored in the mass storage device 828, in the volatile memory 814, in the non-volatile memory 816, and/or on a removable tangible computer readable storage medium such as a CD or DVD.

Figure 9:
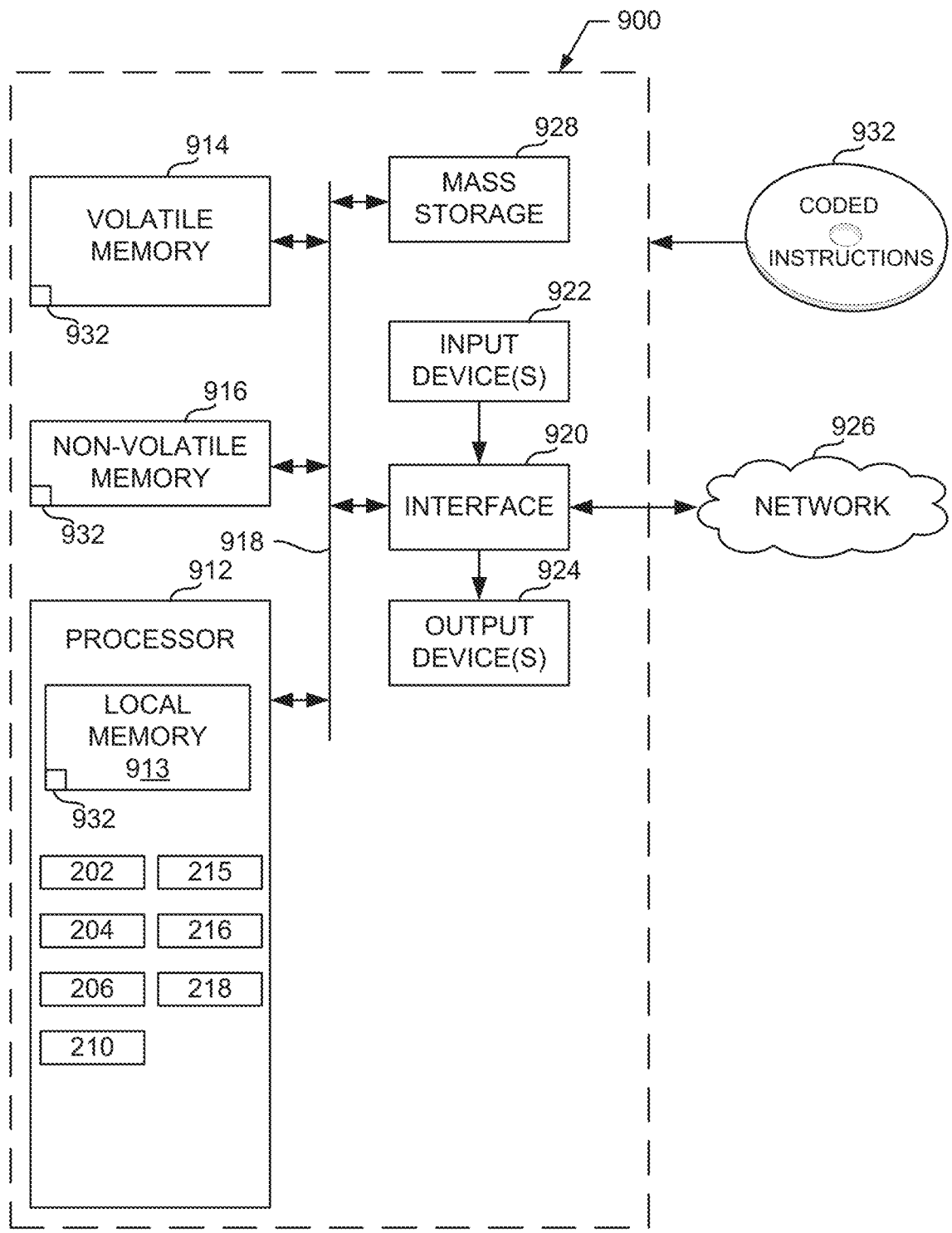

FIG. 9 is a block diagram of an example processor platform 900 capable of executing the instructions of FIG. 3 to implement the local device 102 of FIGS. 1, 2, 4, and/or 5. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the example data receiver 202, the example input samplers 204, the example sample controller 206, the example reference generator 210, the example output samplers 215, the example trainer 216, and the example updater 218.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 3 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that enable the training of a deep learning model by a plurality of local devices. Utilizing multiple local devices facilitates the distributed processing among a plurality of devices. In addition, input data received at each local device may processed at the respective local device to avoid the bandwidth cost of transferring the input data to a central server for processing. In addition, privacy of the locally received input data may be maintained to processing at the local devices instead of transferring to a central server.

It is noted that this patent claims priority from U.S. patent application Ser. No. 16/326,361, which was filed on Feb. 18, 2019, and is hereby incorporated by reference in its entirety.

Example methods, apparatus, systems and articles of manufacture to detect anomalies in electronic data are disclosed herein. Further examples and combinations thereof include the following:

Example 1 is a local device to train deep learning models, the local device comprising: a reference generator to label input data received at the local device to generate training data, a trainer to train a local deep learning model and to transmit the local deep learning model to a server that is to receive a plurality of local deep learning models from a plurality of local devices, the server to determine a set of weights for a global deep learning model, and an updater to update the local deep learning model based on the set of weights received from the server.

Example 2 includes the local device as defined in claim 1, further including a data receiver to receive the input data directly at the local device.

Example 3 includes the local device as defined in claim 1, wherein the local device does not transmit the input data to the server.

Example 4 includes the local device as defined in claim 1, wherein the set of weights are aggregated weights based on the plurality of local deep learning models from the plurality of local devices.

Example 5 includes the local device as defined in one of examples 1-4, further including a sample controller to sample the input data.

Example 6 includes the local device as defined in claim 5, wherein the sample controller is to sample the input data by selecting a pseudo-random portion of the input data.

Example 7 includes the local device as defined in claim 5, wherein the sample controller is to sample the input data by down sampling the input data to reduce a data size of the input data.

Example 8 includes the local device as defined in one of examples 1-4, wherein the trainer is further to determine a difference between a label determined by the labelling and an output of the local deep learning model.

Example 9 includes the local device as defined in example 8, further including a sample controller to sample the output of the local deep learning model prior to the trainer determining the difference.

Example 10 includes the local device as defined in example 8, wherein the trainer is further to adjust the local deep learning model based on the difference.

Example 11 is a non-transitory computer readable medium comprising instructions that, when executed, cause a local device to at least: label input data received at the local device to generate training data, train a local deep learning model, transmit the local deep learning model to a server, the server to receive a plurality of local deep learning models from a plurality of local devices, the server to determine a set of weights for a global deep learning model, and update the local deep learning model based on the set of weights received from the server.

Example 12 includes the non-transitory computer readable medium as defined in example 11, wherein the input data is received directly at the local device.

Example 13 includes the non-transitory computer readable medium as defined in example 11, wherein the input data is not transmitted to the server.

Example 14 includes the non-transitory computer readable medium as defined in example 11, wherein the set of weights are aggregated weights based on the plurality of local deep learning models from the plurality of local devices.

Example 15 includes the non-transitory computer readable medium as defined in one of examples 11-14, wherein the instructions, when executed, cause the local device to sample the input data.

Example 16 includes the non-transitory computer readable medium as defined in example 15, wherein the instructions, when executed, cause the local device to sample the input data by selecting a pseudo-random portion of the input data.

Example 17 includes the non-transitory computer readable medium as defined in example 15, wherein the instructions, when executed, cause the local device to sample the input data by down sampling the input data to reduce a data size of the input data.

Example 18 includes the non-transitory computer readable medium as defined in one of examples 11-14, wherein the instructions, when executed, cause the local device to determine a difference between a label determined by the labelling and an output of the local deep learning model.

Example 19 includes the non-transitory computer readable medium as defined in example 18, wherein the instructions, when executed, cause the local device to sample the output of the local deep learning model prior to the local device determining the difference.

Example 20 includes the non-transitory computer readable medium as defined in example 18, wherein the instructions, when executed, cause the local device to adjust the local deep learning model based on the difference.

Example 21 is a method to train deep learning models, the method comprising: labelling, by executing an instruction with at least one processor at a local device, input data received at the local device to generate training data, training, by executing an instruction with the at least one processor, a local deep learning model, transmitting the local deep learning model to a server, the server to receive a plurality of local deep learning models from a plurality of local devices, the server to determine a set of weights for a global deep learning model, and updating, by executing an instruction with the at least one processor at the local device, the local deep learning model based on the set of weights received from the server.

Example 22 includes the method as defined in example 21, wherein the input data is received directly at the local device.

Example 23 includes the method as defined in example 21, wherein the input data is not transmitted to the server.

Example 24 includes the method as defined in example 21, wherein the set of weights are aggregated weights based on the plurality of local deep learning models from the plurality of local devices.

Example 25 includes the method as defined in one of examples 21-24, further including sampling the input data.

Example 26 includes the method as defined in example 25, wherein the sampling of the input data includes selecting a pseudo-random portion of the input data.

Example 27 includes the method as defined in example 25, wherein the sampling of the input data includes down sampling the input data to reduce a data size of the input data.

Example 28 includes the method as defined in one of examples 21-24, further including determining a difference between a label determined by the labelling and an output of the deep learning model.

Example 29 includes the method as defined in example 28, further including sampling the output of the deep learning model prior to the determining of the difference.

Example 30 includes the method as defined in example 28, further including adjusting the deep learning model based on the difference.

Example 31 is a server comprising: a weight aggregator to aggregate weights of a plurality of local deep learning models received from a plurality of local devices, and a weight distributor to distribute the aggregated weights to the plurality of local devices.

Example 32 includes the server as defined in example 31, further including a global deep learning trainer to train a global deep learning model based on the aggregated weights.

Example 33 includes the server as defined in example 31 or example 32, wherein the server does not receive the input data utilized by the plurality of local devices to generate the plurality of local deep learning models.

Example 34 includes the server as defined in example 31 or example 32, wherein the weight aggregator is to aggregate the set of weights by averaging weights of the plurality of local deep learning models.

Example 35 is a non-transitory computer readable medium comprising instructions that, when executed, cause a server to at least: aggregate weights of a plurality of local deep learning models received from a plurality of local devices, and transmit the aggregated weights to the plurality of local devices.

Example 36 includes the non-transitory computer readable medium as defined in example 35, wherein the instructions, when executed, cause the server to train a global deep learning model based on the aggregated weights.

Example 37 includes the non-transitory computer readable medium as defined in example 35 or example 36, wherein the server does not receive the input data utilized by the plurality of local devices to generate the plurality of local deep learning models.

Example 38 includes the non-transitory computer readable medium as defined in example 35 or example 36, wherein the instructions, when executed, cause the server to aggregate the set of weights by averaging weights of the plurality of local deep learning models.

Example 40 is a method to train deep learning models, the method comprising: aggregating, by executing an instruction with at least one processor of a server, weights of a plurality of local deep learning models received from a plurality of local devices, and transmitting the aggregated weights to the plurality of local devices.

Example 41 includes the method as defined in example 40, further including training a global deep learning model based on the aggregated weights.

Example 42 includes the method as defined in example 40 or example 41, wherein the server does not receive the input data utilized by the plurality of local devices to generate the plurality of local deep learning models.

Example 43 includes the method as defined in example 40 or example 41, wherein the aggregating includes averaging weights of the plurality of local deep learning models.

Example 44 is a system to train deep learning models, the system comprising: local devices to, respectively: label input data received at the corresponding local device to generate training data, train a local deep learning model, transmit the local deep learning model over a network, and a server to: aggregate weights of local deep learning models received from the local devices, and transmit the aggregated weights to the local devices, the local devices to update the local deep learning model based on the set of weights received from the server.

Example 45 includes the system as defined in example 44, wherein the input data is received directly at the local devices.

Example 46 includes the system as defined in example 44, wherein the input data is not transmitted to the server.

Example 47 includes the system as defined in one of examples 44-46, wherein the local devices are further to sample the input data.

Example 48 includes the system as defined in example 47, wherein the local devices are to sample the respective input data by selecting a pseudo-random portion of the input data.

Example 49 includes the system as defined in example 47, wherein the local devices are to sample of the respective input data by down sampling the input data to reduce a data size of the input data.

Example 50 includes the system as defined in one of examples 44-46, wherein the local devices are further to determine a difference between a label determined by the labelling at the respective local device and an output of the local deep learning model at the respective local device.

Example 51 includes the system as defined in example 50, wherein the local devices are further to sample the output of the respective local deep learning model at the respective local device prior to the local devices determining the difference.

Example 52 includes the system as defined in example 50, wherein the local devices are further to adjust the local deep learning model based on the difference.

Example 53 is an apparatus to train deep learning models, the apparatus comprising: means for labelling input data received at the local device to generate training data, means for training a first local deep learning model, means for transmitting the local deep learning model to a server, the server to receive a plurality of local deep learning models from a plurality of local devices, the plurality of local deep learning models including the first deep learning model, the server to determine a set of weights for a global deep learning model, and means for updating the first local deep learning model based on the set of weights received from the server.

Example 54 includes the apparatus as defined in example 53, further including means for receiving the input data directly at the local device.

Example 55 includes the local device of Example 1, the non-transitory computer readable medium of Example 11, or the example method of Example 21, wherein the input data does not pass through the server.

Example 56 includes the local device of Example 1, the non-transitory computer readable medium of Example 11, or the example method of Example 21, wherein the local device includes a sensor to collect the input data.

Example 57 includes the local device of Example 1, the non-transitory computer readable medium of Example 11, or the example method of Example 21, wherein the local device and/or the data receiver is communicatively coupled to a sensor that collects the input data and transmits the input data to the local device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable medium comprising instructions that, when executed, cause a machine to:
   obtain first weights associated with a first machine learning model trained by a first computing device;
   obtain second weights associated with a second machine learning model trained by a second computing device;
   aggregate the first weights associated with the first machine learning model and the second weights associated with the second machine learning model;
   update a global machine learning model with the aggregated first weights and the aggregated second weights; and
   share the updated global machine learning model to the first computing device and the second computing device, the first computing device to generate an updated first machine learning model based on the updated global machine learning model, the second computing device to generate an updated second machine learning model based on the updated global machine learning model.

2. The non-transitory computer readable medium of claim 1, wherein the first computing device is local to a first location and the second computing device is local to a second location, the first location different than the second location.

3. The non-transitory computer readable medium of claim 1, wherein the first machine learning model is obtained by the first computing device from a central server device where the global machine learning model is stored.

4. The non-transitory computer readable medium of claim 3, wherein the second machine learning model is obtained by the second computing device from the central server device where the global machine learning model is stored.

5. The non-transitory computer readable medium of claim 1, wherein the first computing device is to calculate the first weights associated with the first machine learning model based on local data at the first computing device.

6. The non-transitory computer readable medium of claim 5, wherein the second computing device is to calculate the second weights associated with the second machine learning model based on local data at the second computing device.

7. A non-transitory computer readable medium comprising instructions that, when executed, cause a machine to:
   obtain a global model from a server;
   label input data based on a reference system of the global model;
   train a machine learning model using the global model based on a difference between a label for the input data indicated from the reference system of the global model and an output of the machine learning model based on the input data;
   calculate weights associated with the trained machine learning model; and
   transmit the weights associated with the trained machine learning model to the server, the server to update the global model with the weights associated with the trained machine learning model.

8. The non-transitory computer readable medium of claim 7, further including instructions to cause the machine to calculate the weights associated with the trained machine learning model based on local data.

9. The non-transitory computer readable medium of claim 7, wherein the calculated weights are first weights, the trained machine learning model is a first trained machine learning model, and the server is to update the global model using the first weights associated with the first trained machine learning model and second weights associated with a second trained machine learning model.

10. The non-transitory computer readable medium of claim 9, wherein the machine learning model is a first machine learning model, further including instructions to cause the machine to train the first machine learning model with the global model updated with the first weights and the second weights.

11. The non-transitory computer readable medium of claim 9, wherein the machine is a first machine, the second weights associated with the second trained machine learning model are based on local data of a second machine, and the first machine is different than the second machine.

12. The non-transitory computer readable medium of claim 7, wherein the reference system is a target system to be modelled by the machine learning model.

13. The non-transitory computer readable medium of claim 12, wherein the reference system includes a transfer function to be learned by the machine learning model.

14. A system comprising:
a first computing device to:
obtain a global machine learning model;
train a first machine learning model using the global machine learning model; and
calculate first weights associated with the first trained machine learning model;
a second computing device to:
obtain a global machine learning model;
train a second machine learning model using the global machine learning model; and
calculate second weights associated with the second trained machine learning model; and
a server to:
obtain the first weights associated with the first trained machine learning model from the first computing device;
obtain the second weights associated with the second trained machine learning model from the second computing device;
aggregate the first weights associated with the first machine learning model and the second weights associated with the second machine learning model;
update the global machine learning model with the aggregated first weights and second weights; and
share the updated global machine learning model to the first computing device and the second computing device, the first computing device to generate an updated first machine learning model based on the updated global machine learning model, the second computing device to generate an updated second machine learning model based on the updated global machine learning model.

15. The system of claim 14, wherein the first computing device is local to a first location and the second computing device is local to a second location, the first location different than the second location.

16. The system of claim 14, wherein the first computing device is to calculate the first weights associated with the first trained machine learning model based on local data at the first computing device.

17. The system of claim 14, wherein the second computing device is to calculate the second weights associated with the second trained machine learning model based on local data at the second computing device.

18. The system of claim 14, wherein:
the first computing device is to transmit the first weights associated with the first trained machine learning model to the server; and
the second computing device is to transmit the second weights associated with the second trained machine learning model to the server.

19. The system of claim 14, wherein the first machine learning model is obtained by the first computing device from a central server device where the global machine learning model is stored.

20. The system of claim 19, wherein the second machine learning model is obtained by the second computing device from the central server device where the global machine learning model is stored.

* * * * *